US012644350B2

(12) United States Patent
Holman et al.

(10) Patent No.: US 12,644,350 B2
(45) Date of Patent: Jun. 2, 2026

(54) SHALE SHAKERS AND RELATED METHODS

(71) Applicant: National Oilwell Varco, L.P., Houston, TX (US)

(72) Inventors: Ian Holman, Pearland, TX (US); Brian Whisenant, Kingwood, TX (US); Caleb Tubbleville, Tomball, TX (US)

(73) Assignee: National Oilwell Varco, L.P., Houston, TX (US)

(*) Notice: Subject to any disclaimer, the term of this patent is extended or adjusted under 35 U.S.C. 154(b) by 332 days.

(21) Appl. No.: 18/197,783

(22) Filed: May 16, 2023

(65) Prior Publication Data

US 2023/0366279 A1 Nov. 16, 2023

Related U.S. Application Data

(60) Provisional application No. 63/342,387, filed on May 16, 2022.

(51) Int. Cl.
*E21B 21/06* (2006.01)
*B01D 33/03* (2006.01)

(52) U.S. Cl.
CPC ........ *E21B 21/065* (2013.01); *B01D 33/0376* (2013.01); *B01D 2201/4007* (2013.01)

(58) Field of Classification Search
CPC .............. E21B 21/065; B01D 33/0376; B01D 2201/4007; B07B 1/4645; B07B 2201/02
See application file for complete search history.

(56) References Cited

U.S. PATENT DOCUMENTS

| | | | |
|---|---|---|---|
| 6,935,511 B2 | 8/2005 | Seyffert et al. | |
| 2002/0000399 A1 | 1/2002 | Winkler et al. | |
| 2004/0245155 A1 | 12/2004 | Strong et al. | |
| 2006/0243643 A1 | 11/2006 | Scott et al. | |
| 2010/0084329 A1* | 4/2010 | Hukki ...................... | B07B 1/46 |
| | | | 210/232 |
| 2011/0220556 A1* | 9/2011 | Malmberg ............ | B07B 1/4645 |
| | | | 209/412 |
| 2016/0207069 A1 | 7/2016 | Pomerleau | |

FOREIGN PATENT DOCUMENTS

CN 103691669 B 3/2017

OTHER PUBLICATIONS

International Search Report and Written Opinion dated Aug. 8, 2023, for Application No. PCT/US2023/022316.

* cited by examiner

*Primary Examiner* — Benjamin M Kurtz
(74) *Attorney, Agent, or Firm* — Conley Rose, P.C.

(57) ABSTRACT

A shale shaker for separating formation cuttings from a drilling fluid includes a basket and a screen deck positioned within the basket. The screen deck includes a plurality of screens positioned on a plurality of screen supports, such that each screen is positioned on a corresponding one of the plurality of screen supports. Each screen includes a top side, a bottom side opposite the top side, and a mounting bracket positioned along the bottom side. The mounting bracket includes a pair of parallel first support members and a clamping bar coupled to and extending between the pair of first support members. Each screen support includes a pair of parallel second support members and a latch assembly including a hook assembly positioned between the pair of second support members. The hook assembly is configured to engage with the clamping bar to secure the screen to the screen support.

20 Claims, 15 Drawing Sheets

1

SHALE SHAKERS AND RELATED METHODS

CROSS-REFERENCE TO RELATED APPLICATIONS

The present application claims benefit of U.S. Provisional Patent Application No. 63/342,387 filed May 16, 2022, and entitled "Shale Shakers and Related Methods", which is hereby incorporated herein by reference in its entirety.

STATEMENT REGARDING FEDERALLY SPONSORED RESEARCH OR DEVELOPMENT

Not applicable.

BACKGROUND

The formation of a subterranean wellbore to access minerals or other resources (e.g., oil, gas, water, etc.) typically involves attaching a drill bit to the end of a drill string and rotating the drill string and the drill bit while engaging the rotating drill bit with subterranean formation. With weight applied to the drill string, the rotating drill bit forms a wellbore (or borehole) within the subterranean formation along a predetermined path toward a target zone.

During the drilling process, drilling fluid is pumped through the drill string and directed out of the face of the drill bit so as to perform several functions. For instance, the drilling fluid may flow formation cuttings (e.g., rock chips) away from the cutting structure of the drill bit and the bottom of the wellbore and toward the surface.

SUMMARY

Some embodiments disclosed herein are directed to a shale shaker for separating formation cuttings from a drilling fluid. In some embodiments, the shale shaker includes a basket and a screen deck positioned within the basket. The screen deck comprises a plurality of screens positioned on a plurality of screen supports, such that each screen is positioned on a corresponding one of the plurality of screen supports. Each screen includes a top side, a bottom side opposite the top side, and a mounting bracket positioned along the bottom side. The mounting bracket comprises a pair of parallel first support members and a clamping bar coupled to and extending between the pair of first support members. Each screen support includes a pair of parallel second support members and a latch assembly including a hook assembly positioned between the pair of second support members. The hook assembly is configured to engage with the clamping bar to secure the screen to the screen support.

Some embodiments disclosed herein a directed to a screen deck for a shale shaker. In some embodiments, the screen deck includes a top side and a bottom side opposite the top side, a screen member including a plurality of openings on the top side, and a clamping bar coupled to the bottom side. In addition, the screen deck includes a screen support including a plurality of first support members and a latch assembly including a hook assembly. The bottom side of the screen is configured to engage with the plurality of first support members of the screen support, and the hook assembly is configured to engage with the clamping bar to pull the screen onto the screen support.

Some embodiments disclosed herein are directed to a shale shaker for separating formation cuttings from a drilling fluid. In some embodiments, the shale shaker includes a basket including a trough, a screen positioned within the trough, the screen including a top side and a bottom side opposite the top side, and a clamping bar coupled to the bottom side of the screen. In addition, the shale shaker includes a latch assembly including a hook assembly that is configured to engage the clamping bar to secure the screen with in the trough of the basket.

Some embodiments disclosed herein are directed to a screen for a shale shaker. In some embodiments, the screen includes a top side and a bottom side opposite the top side. In addition, the screen includes a screen member including a plurality of openings on the top side. Further, the screen includes a mounting bracket positioned along the bottom side. The mounting bracket comprises a pair of parallel first support members and a clamping bar coupled to and extending between the pair of first support members.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

As previously described, when drilling a subterranean wellbore, drilling fluid may be emitted from the drill bit to sweep or flow formation cuttings away from the drill bit and out of the wellbore, among other things. Thus, during drilling operations, drilling fluid with formation cuttings suspended therein may be emitted from the wellbore at the surface. Ultimately, the drilling fluid is recirculated into the wellbore to further support the drilling operation as described above. However, before the drilling fluid can be recirculated into the subterranean wellbore, the formation cuttings may first be filtered or otherwise removed from the drilling fluid.

Thus, upon exiting the subterranean wellbore, the drilling fluid may be routed through a shaker that is configured to separate formation cuttings from the drilling fluid before the drilling fluid is recirculated back into the subterranean wellbore. Such a shaker may be referred to as a so-called "shale shaker." The shale shaker may include one or more screens that capture formation cuttings, while allowing the drilling fluid to proceed therethrough. Typically, the screens of a shale shaker may be secured using one or more attachment systems that compress the screens from above on a suitable support frame or member. However, such attachment mechanisms may complicate screen installation and withdrawal from the shale shaker (e.g., during construction, deconstruction, maintenance, etc.) by creating an obstruction that may limit the direction of screen insertion or withdrawal, particularly from above.

To address the foregoing, embodiments disclosed herein include shale shakers having screens that may be secured via latch assemblies that are positioned below the screen, so as to allow for screen insertion into or withdrawal in a vertical direction. Accordingly, the embodiments disclosed herein may simplify and/or enhance the construction, deconstruction, and/or maintenance of the screens of a shale shaker.

Figure 1:
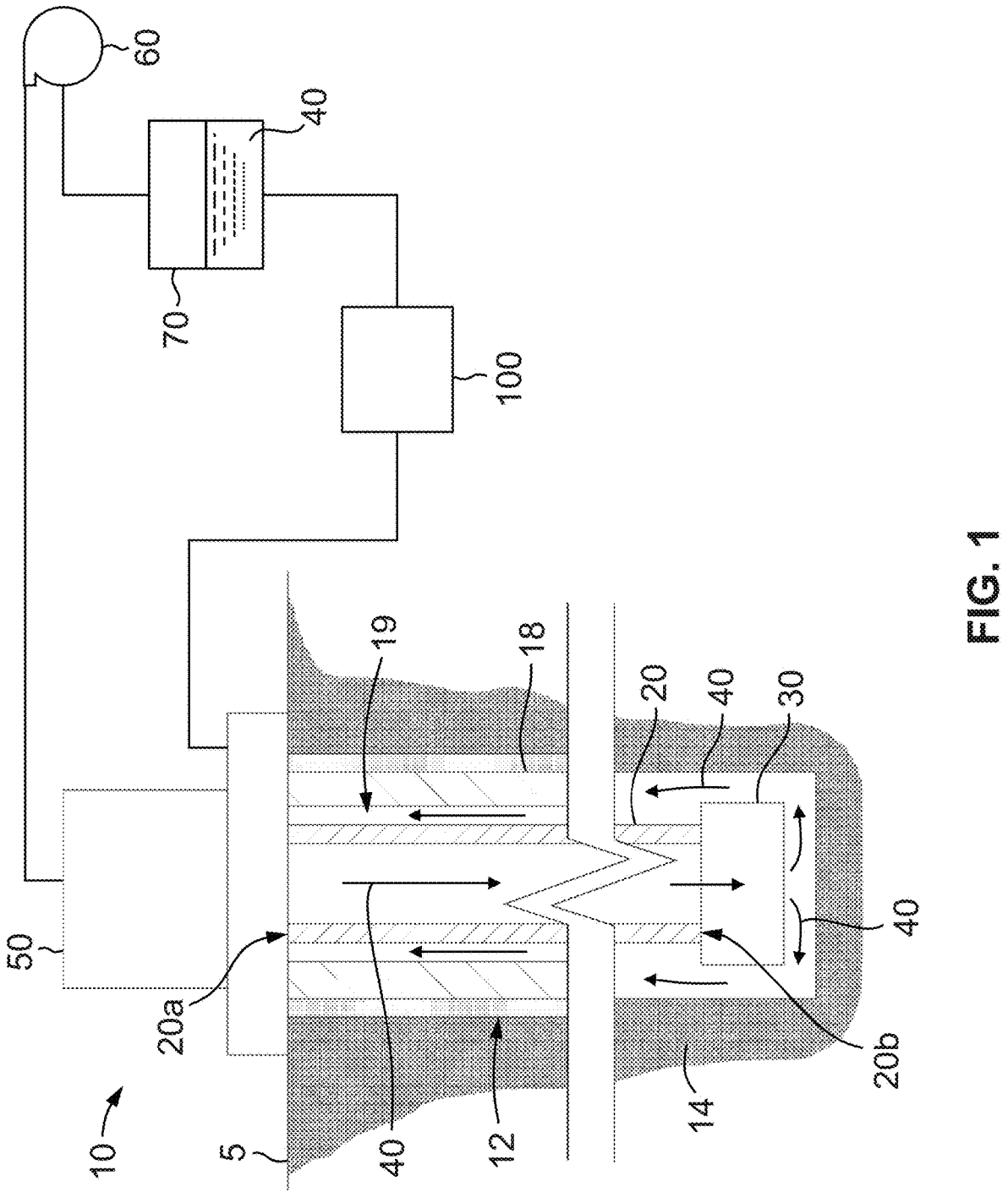
FIG. 1 is a schematic diagram of a system for drilling a subterranean wellbore according to some embodiments.

Referring now to FIG. 1, a system 10 for drilling a subterranean wellbore 12 according to some embodiments is shown. The wellbore 12 extends from the surface 5 into a subterranean formation 14 to access minerals or other resources (e.g., oil, gas, water, etc.). A liner or casing pipe 18 may be cemented into or otherwise secured within the wellbore 12. The casing pipe 18 may prevent collapse of the wellbore 12 and may provide a controlled flow path for the flow of fluids into and out of the wellbore 12 during operations. A drill string 20 is inserted within the wellbore 12 from surface equipment 50 positioned at the surface 5. The surface equipment 50 may comprise a derrick or any other suitable assembly for supporting drill string 20 at the surface 5 during drilling operations.

Drill string 20 may include a first or uphole end 20*a* that is positioned at or near the surface 5 and a second or downhole end 20*b* that is inserted within the wellbore 12. The drill string 20 may comprise a plurality of tubular members (e.g., pipes) that are coupled (e.g., threadably coupled) end-to-end between the ends 20*a*, 20*b*.

A drill bit 30 is coupled to the downhole end 20*b* of the drill string 20. The drill bit 30 may comprise a cutting structure (not shown) that may engage with the formation to form the wellbore 12 during operations as described in more detail below. The drill bit 30 may comprise any suitable drill bit, such as, for instance a fixed cutter drill bit (or drag bit), rolling cone drill bit, coring bit, etc. Thus, the precise cutting structure (not shown) of drill bit 30 may be varied and is ultimately determined based on a variety of factors, such as, the type of rock in formation 14, the length or direction of wellbore 12, etc.

During operations, drill bit 30 drill string 20 may be rotated via the surface equipment 50 while weight is applied to drill bit 30 so that the rotating drill bit 30 engages with formation 14 to lengthen wellbore 12. In some embodiments, the drill bit 30 may be rotated by a suitable motor (e.g., a mud-motor) that is coupled to the drill string 20 and positioned within wellbore 12. Regardless of the method for rotating drill bit 30, as the rotating drill bit 30 engages with formation 14, drilling fluid 40 (e.g., drilling mud) is flowed through drill string 20 and out of the drill bit 30 (e.g., particularly out of the cutting structure on the end of the drill bit). The drilling fluid 40 is then directed back toward the surface 5 along the outside of drill string 20 and, at a certain depth, through an annulus 19 defined between the drill string 20 and the casing pipe 18 (or within a tubular or annulus defined by one or more nested tubulars that are inserted within wellbore 12).

As previously described above, the drilling fluid 40 emitted from the wellbore 12 via the surface equipment 50 may include formation cuttings, such as rock chips, from the subterranean formation 14. Thus, after flowing out of the wellbore 12, the drilling fluid 40 is flowed through a shale shaker 100 (or a plurality of shale shakers 100) that is configured to remove the formation cuttings. The shale shaker 100 may be more simply referred to herein as a "shaker 100." Thereafter, the filtered drilling fluid 40 may then be flowed into a reservoir 70 (e.g., tank, pit, container, etc.). A pump 60 may receive a flow of drilling fluid 40 from the reservoir 70 and may pressurize the drilling fluid 40 for injection back into the drill string 20 and wellbore 12 via surface equipment 50 as previously described.

Figure 2:
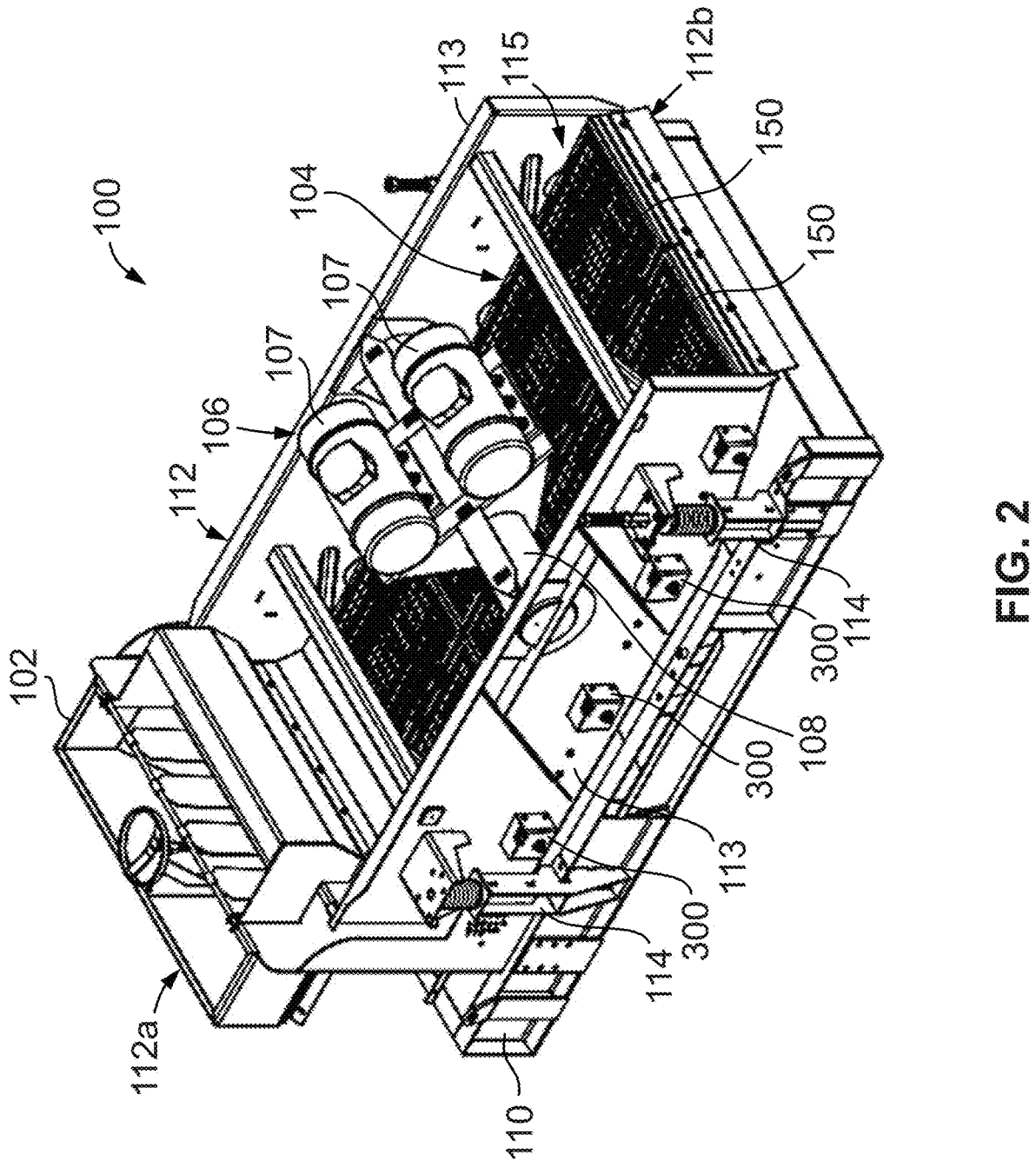
FIG. 2 is a perspective view of a shaker that may be used in the system of FIG. 1 according to some embodiments.

Referring now to FIG. 2, a perspective view of shaker 100 that may be used within system 10 of FIG. 1 is shown according to some embodiments. Shaker 100 includes a basket 112 supported on top of a base 110 via a plurality of spring-loaded vibration isolation assemblies 114. As is discussed in more detail below, during operations, the basket 112 may shake and shift relative to the base 110 via the vibration isolation assemblies 114. Thus, the vibration isolation assemblies 114 may reduce the transfer of vibrations from the basket 112 to the base 110 during these operations.

Basket 112 includes a first end 112*a* and a second end 112*b* opposite first end 112*a*. A hopper 102 is positioned at the first end 112*a* that is configured to receive a flow of drilling fluid (e.g., drilling fluid 40 in FIG. 1) during operations. In addition, basket 112 includes a pair of parallel side walls 113 extending from hopper 102 to second end 112*b*. The side walls 113 may define a trough 115 that receives drilling fluids and formation cuttings from hopper 102 during operations.

A screen deck 104 is inserted within the trough 115 that extends between the side walls 113, from hopper 102 to second end 112*b*. The screen deck 104 includes a plurality of screens 150 that are secured to a plurality of screen supports (not specifically shown in FIG. 2) which may be further supported (e.g., either directly or indirectly) by side walls 113. During operations drilling fluid (e.g., drilling fluid 40 in FIG. 1), with formation cuttings therein, is flowed into the hopper 102, which then directs the drilling fluid onto the screen deck 104 within trough 115. The screens 150 of screen deck 104 include a plurality of holes or openings (152a in FIG. 5) that are sized to prevent formation cuttings (or most formation cuttings) from passing therethrough. However, the holes in screens 150 allow drilling fluid 40 to pass through screen deck 104 and into base 110. The base 110 may thus define a tank or reservoir that receives the filtered drilling fluid and may communicate the received drilling fluid to another component or assembly (e.g., reservoir 70, pump 60 shown in FIG. 1).

In addition, shaker 100 has an excitation assembly 106 including one or more masses 107 that are reciprocally movable along an excitation shaft 108 to induce the basket 112 to vibrate and shake relative to base 110 via the vibration isolation assemblies 114 as noted above. As a result, the screen deck 104 may vibrate and shake along with the basket 112 during operations so that formation cuttings that are positioned on top of screens 150 may progress along screen deck 104 to the second end 112b where the cuttings are removed from shaker 100. Thus, the first end 112a may define an inlet (or inlet end) for the shaker 100, and the second end 112b may define an outlet (or outlet end) for the shaker 100.

Figure 3:
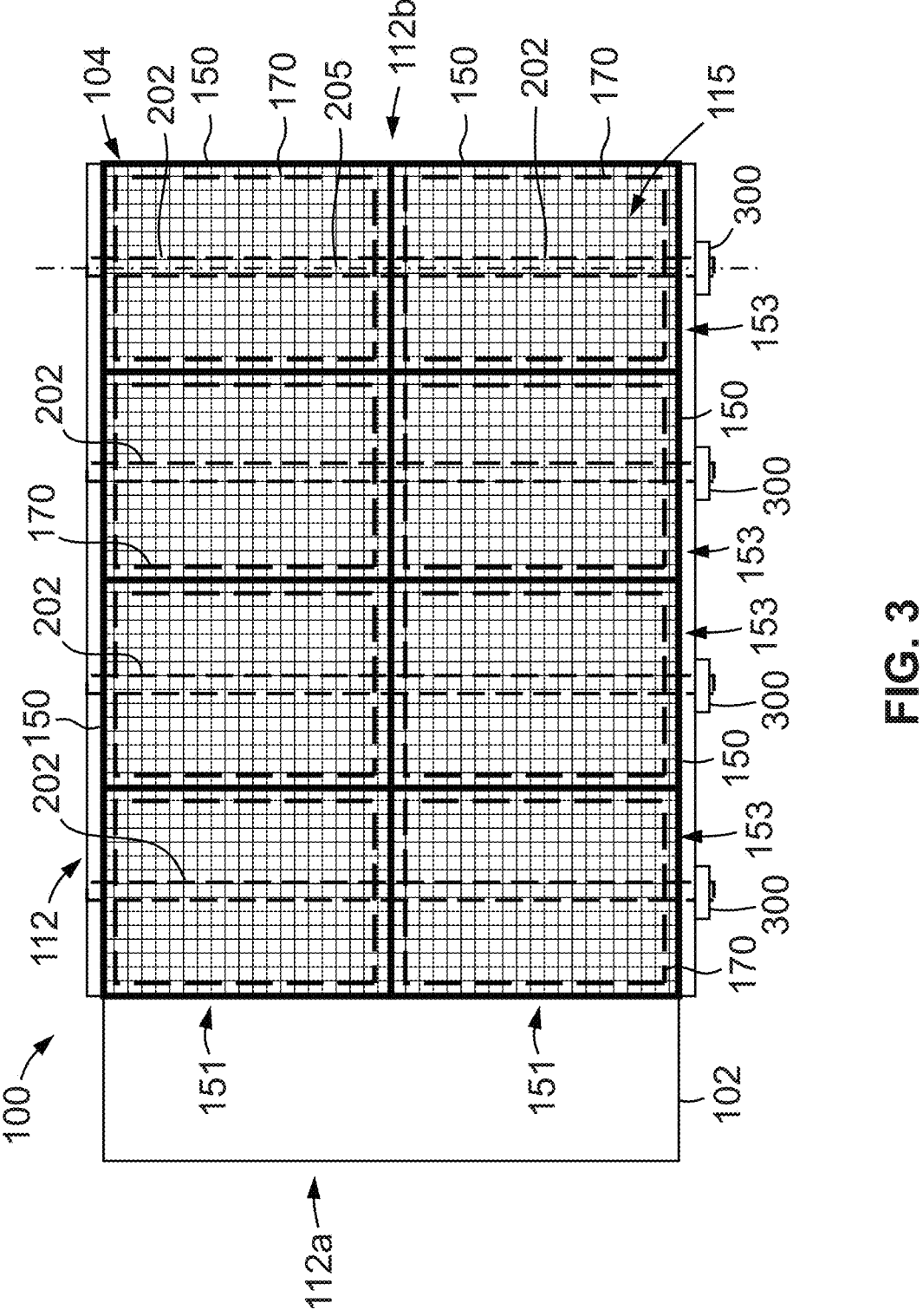
FIG. 3 is a top, schematic view of the shaker of FIG. 2, illustrating a screen deck of the shaker according to some embodiments.

Referring now to FIG. 3, screen deck 104 includes a plurality of screens 150 that are arranged in a grid pattern including one or more rows 151 extending parallel to the side walls 113 between hopper 102 and second end 112b, and one or more columns 153 extending perpendicularly (or spanning) between side walls 113. For instance, in the particular example of FIG. 3, the screen deck 104 includes two rows 151 and four columns 153 of screens 150; however, other numbers and arrangements (e.g., different numbers of rows 151 and columns 153) may be used in various embodiments. As mentioned above, each screen 150 of screen deck 104 is supported by a corresponding screen support 170 that is further supported (directly or indirectly) by side walls 113. Each screen support 170 underlies one of the screens 150. As shown, screen supports 170 are merely schematically indicated with an inset dotted rectangle within each screen in FIG. 3 to indicate their general position, and further details of screen supports 170 and screens 150 are provided below. Thus, the screen supports 170 may also be arranged in the same rows 141 and columns 153 as the screens 150.

Figure 4:
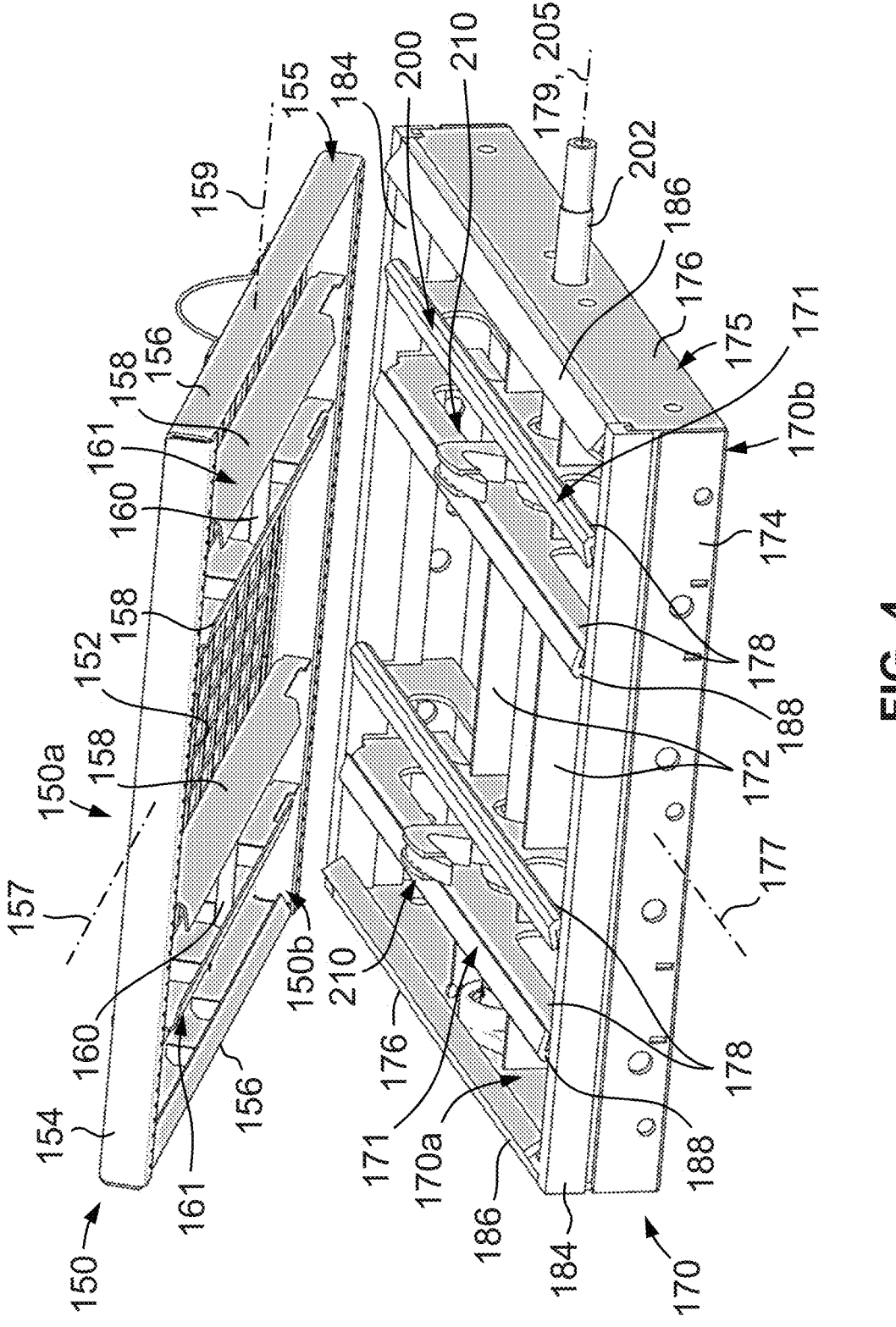
FIG. 4 is an exploded, perspective view of a screen and screen support that form part of the screen deck of the shaker of FIG. 2 according to some embodiments.
Figure 5:
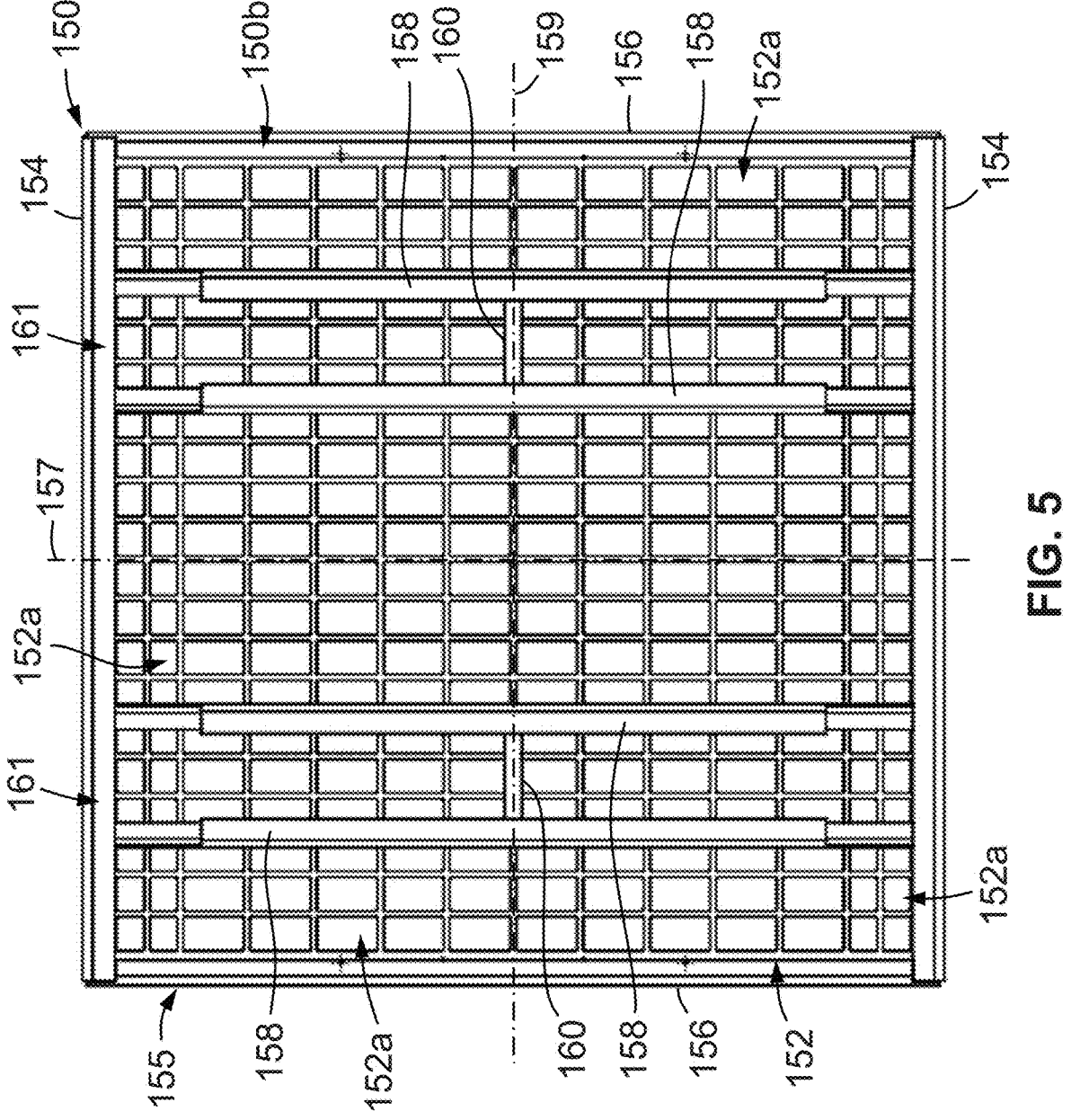
FIG. 5 is a bottom view of the screen of FIG. 4 according to some embodiments.

Referring now to FIGS. 4 and 5, one of the screens 150 and screen supports 170 of FIG. 3 is shown according to some embodiments. It should be appreciated that the other screens 150 and screen supports 170 are shown in more detail according to some embodiments. Screen 150 is a rectangular member extending in a plane defined by a pair of orthogonal axes 157, 159, which may be referred to herein as a first axis 157 and a second axis 159. Screen 150 includes an outer perimeter 155 (or more simply "perimeter 155"), a first or top side 150a, and a second or bottom side 150b opposite top side 150a.

The perimeter 155 includes a pair of parallel first members 154 and a pair of parallel second members 156 extending between the first members 154. The first members 154 extend axially with respect to second axis 159 and radially with respect to first axis 157, and the second members 156 extend axially with respect to first axis 157 and radially with respect to second axis 159. Thus, the first members 154 extend perpendicularly to second members 156. The first members 154 and second members 156 may be secured to one another (e.g., via welding, bolts, rivets, etc.) or may be formed of a one or more monolithic members that are bent or otherwise deformed to assume the rectangular perimeter 155. A screen member 152 is secured to the first members 154, 156 along the top side 150a. The screen member 152 may extend along or parallel to the plane defined by the axes 157, 159, and may comprise a grid of elongate rods or other members that define a plurality of holes 152a.

A plurality of mounting brackets 161 are coupled to and between the first members 154 along bottom side 150b of screen 150 and within the perimeter 155. Each mounting bracket 161 includes a pair of elongate support members 158 that are secured to (e.g., via welding, bolts, rivets, etc.) and extend perpendicularly between the first members 154. In addition, each mounting bracket 161 includes a clamping shaft or bar 160 that extends perpendicularly between the pair of support members 158. Thus, the support members 158 of each mounting bracket 161 extend parallel to the second members 156 of perimeter 155 and the first axis 159, and the clamping bar 160 of each mounting bracket 161 extends parallel to the first members 154 and the second axis 159. As shown in FIG. 5, the clamping bars 160 may be coaxially aligned with and along the second axis 159.

Figure 6:
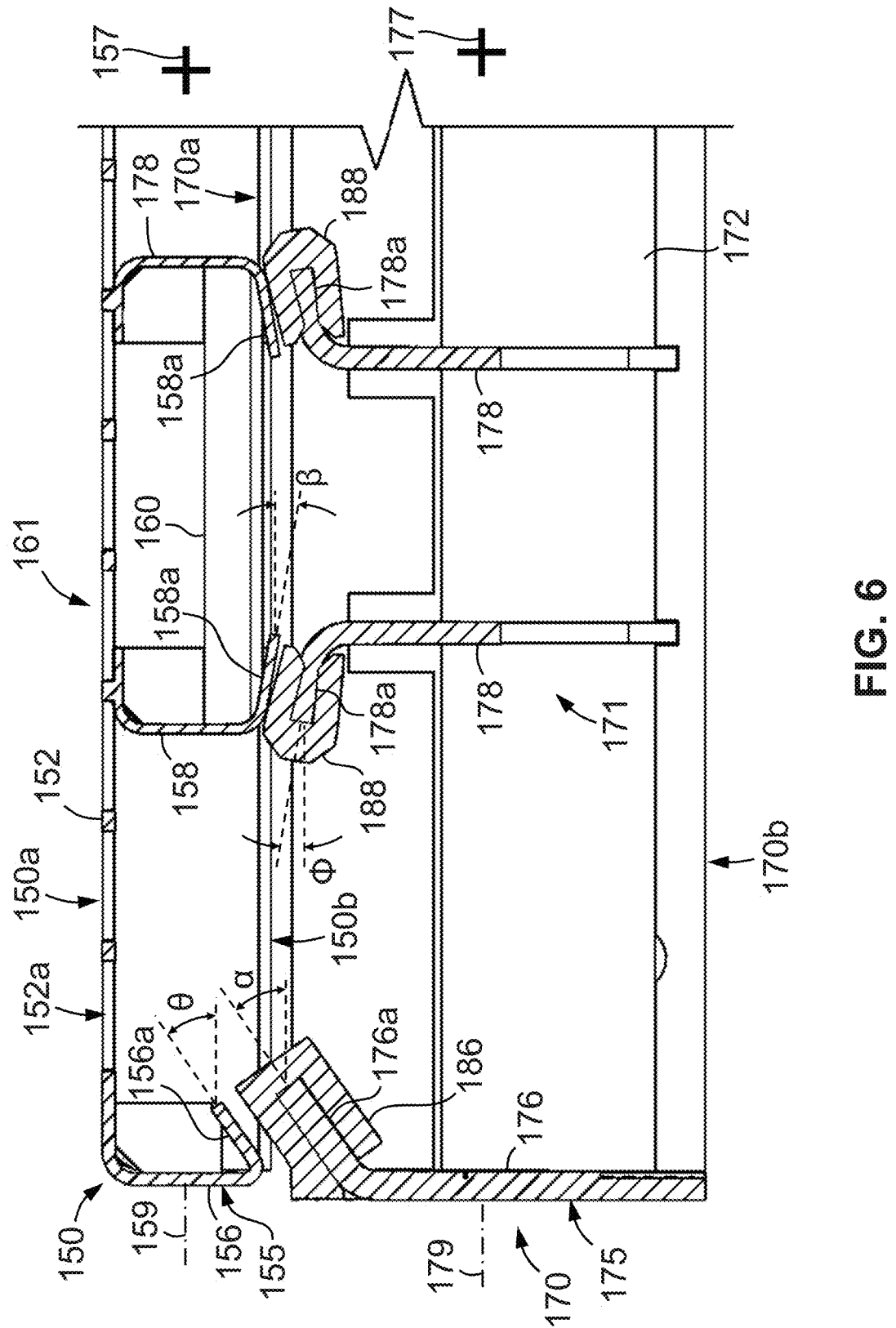
FIGS. 6 and 7 are enlarged cross-sectional views of the engaged screen and screen support of FIG. 4 according to some embodiments.
Figure 7:
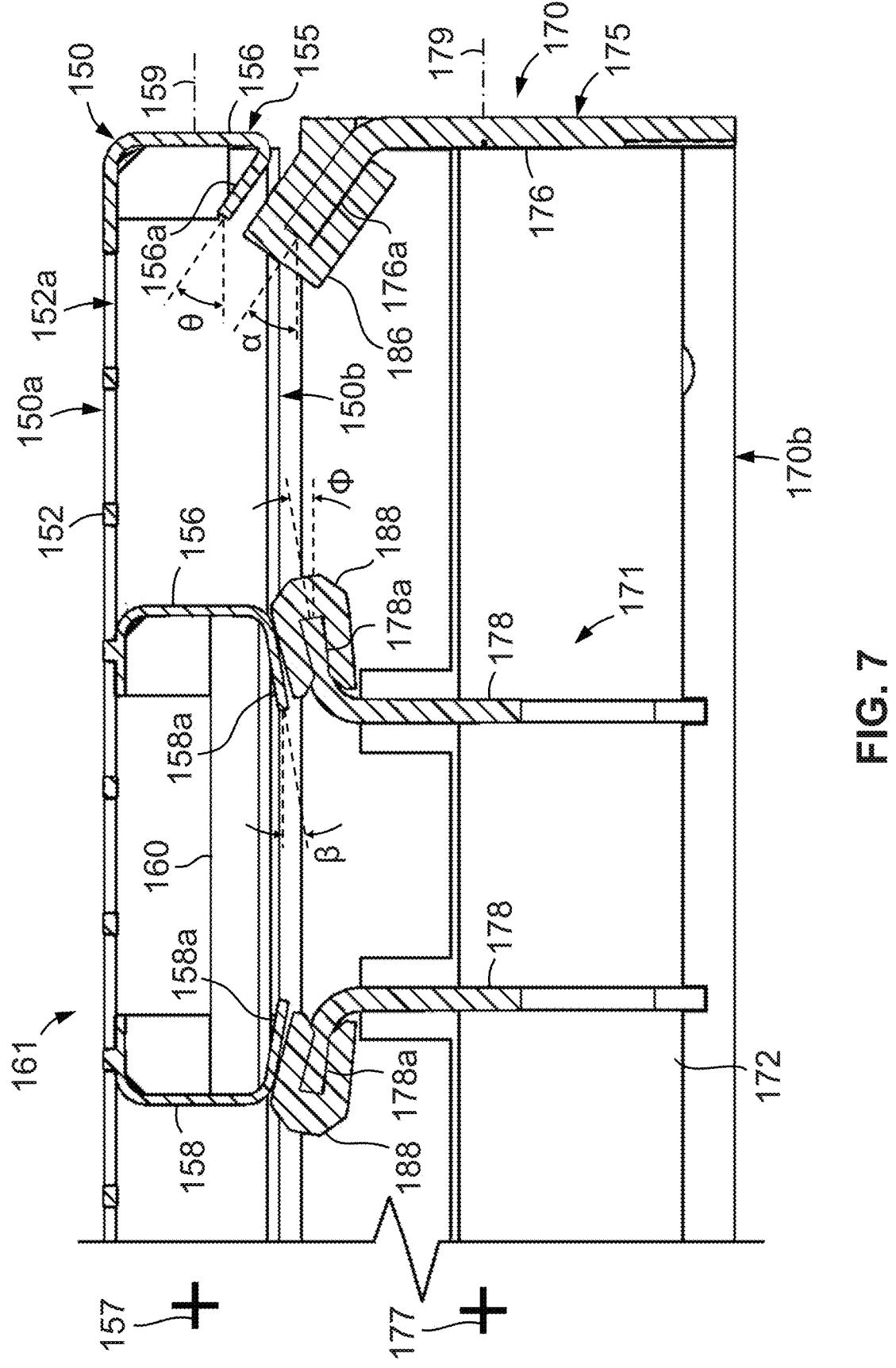

Referring now to FIGS. 4, 6, and 7, screen support 170 is a rectangular member extending in a plane defined by a pair of orthogonal axes 177, 179—which may be referred to herein as a first axis 177 and a second axis 179. More particularly, the screen support 170 includes an outer perimeter 175 (or more simply "perimeter 175"), a first or top side 170a, and a second or bottom side 170b opposite tope side 170a.

The perimeter 175 includes a pair of parallel first members 174 and a pair of parallel second members 176 extending between the first members 174. The first members 174 extend axially with respect to second axis 179 and radially with respect to first axis 177, and the second members 176 extend axially with respect to first axis 177 and radially with respect to second axis 179. Thus, the first members 174 extend perpendicularly to second members 176. The first members 174 and second members 176 may be secured to one another (e.g., via welding, bolts, rivets, etc.) or may be formed of a one or more monolithic members that are bent or otherwise deformed to assume the rectangular perimeter 175.

A plurality of mounting assemblies 171 are coupled to and between the first members 174 along top side 170a of screen support 170 and within the perimeter 175. Each mounting assembly 171 includes a pair of support members 178 that are secured to (e.g., via welding, bolts, rivets, etc.) and extend perpendicularly between the pair of first members 174 within the perimeter 175. The support members 178 extend axially with respect to second axis 179 and radially with respect to first axis 177. In addition, a plurality of stiffening members 172 are secured to and extend perpendicularly to the pair of second members 176. The stiffening members 172 extend axially with respect to second axis 179 and radially with respect to first axis 177. Thus, the support members 178 may extend parallel to the pair of second members 176 and the stiffening members 172 may extend parallel to the pair of first members 174. The stiffening members 172 extend perpendicularly through the plurality of support members 178 so as to stiffen and support the support members 178 to prevent (or limit) deflection thereof during operations.

Referring still to FIGS. 4, 6, and 7, the bottom side 150*b* of screen 150 is engaged with the top side 170*a* of screen support 170. In particular, the plurality of first members 154 and second members 156 of perimeter 155 are engaged with the plurality of first members 174 and second members 176 of perimeter 170, respectively. In addition, the plurality of support members 158 are engaged with the plurality of support members 178. Thus, when screen 150 is engaged with screen support 170 as shown in FIGS. 6 and 7, the plane defined by and including the axes 157, 159 is substantially parallel to the plane defined by and including the axes 177, 179.

As best shown in FIGS. 6 and 7, each of the plurality of second members 156 of perimeter 155 may include an angled end 156*a* that projects inward from the perimeter 155 and that is angled toward top side 150*a* and away from bottom side 150*a* at an angle θ relative to the plane defined by (and thus including) the first axis 157 and second axis 159. In addition, the support members 158 of each support bracket 161 may include angled ends 158*a* that project toward one another, and that are angled toward bottom side 150*b* and away from top side 150*a* at an angle β relative to the plane defined by and including the axes 157, 159. Thus, the angled ends 158*a* are angled downward (or in a generally downward) direction. Further, each of the second members 176 includes an angled end 176*a* that projects inward from the perimeter 175 and that is angled toward top side 170*a* and away from bottom side 170*b* at an angle α relative to the plane defined by (and thus including) the first axis 177 and the second axis 179. Still further, the support members 178 of each mounting assembly 171 may include angled ends 178*a* that project away one another, and that are angled toward top side 170*a* and away from bottom side 170*b* at an angle φ relative to the plane defined by and including the axes 177, 179. Thus, the angled ends 178*a* are angled upwards (or in an upward direction).

As shown in FIGS. 6 and 7, when the bottom side 150*b* of screen 150 is engaged with the top side 170*a* of screen support 170, the angled ends 156*a* of second members 156 may engage with the angled ends 176*a* of second members 176 and the angled ends 158*a* of the support members 158 of mounting brackets 161 may engage with the angled ends 178*a* of the support members 178 of mounting assembly 171. The angles θ, α of the engaged ends 156*a*, 176*a* and the angles β, φ of the engaged ends 158*a*, 178*a* may encourage the screen 150 to center or align itself with the screen support 170 during operations. The angles θ, α may be equal to one another or may be different, and the angles β, φ may equal one another or may be different in some embodiments. In addition, the angles θ, α, β, φ may each be greater than 0° and less than 90° in some embodiments. Thus, the angles θ, α, β, φ may all be referred to as acute angles.

Referring still to FIGS. 4, 6, and 7, a plurality of wear members 184, 186, 188 may be engaged with the screen support 170 to prevent direct contact between the screen 150 and screen support 170 during operations. Specifically, as best shown in FIG. 4, a first pair of wear members 184 may be engaged with the first members 174 at the top side 170*a* that are to engage with the first members 154 of screen 150 at bottom side 150*b*. In addition, a pair of wear members 186 covers the angled ends 176*a* of second members 176, and a plurality of wear members 188 cover the angled ends 178*a* of the support members 178 on mounting assembly 171.

The wear members 184, 186, 188 may comprise a compliant material, such as an elastomeric material. In some embodiments, the wear members 184, 186, 188 may comprise a metallic material, such as a metallic material that is softer than a material forming the screen 150 and screen support 170. The wear members 186, 188 may generally comprise elongate members that have a U-shaped cross-section (FIGS. 6 and 7). Without being limited to this or any other theory, the wear members 184, 186, 188 may dampen relative vibrations or movement between the screens 150 and screen supports 170 so that wearing of these components may be reduced.

Figure 8:
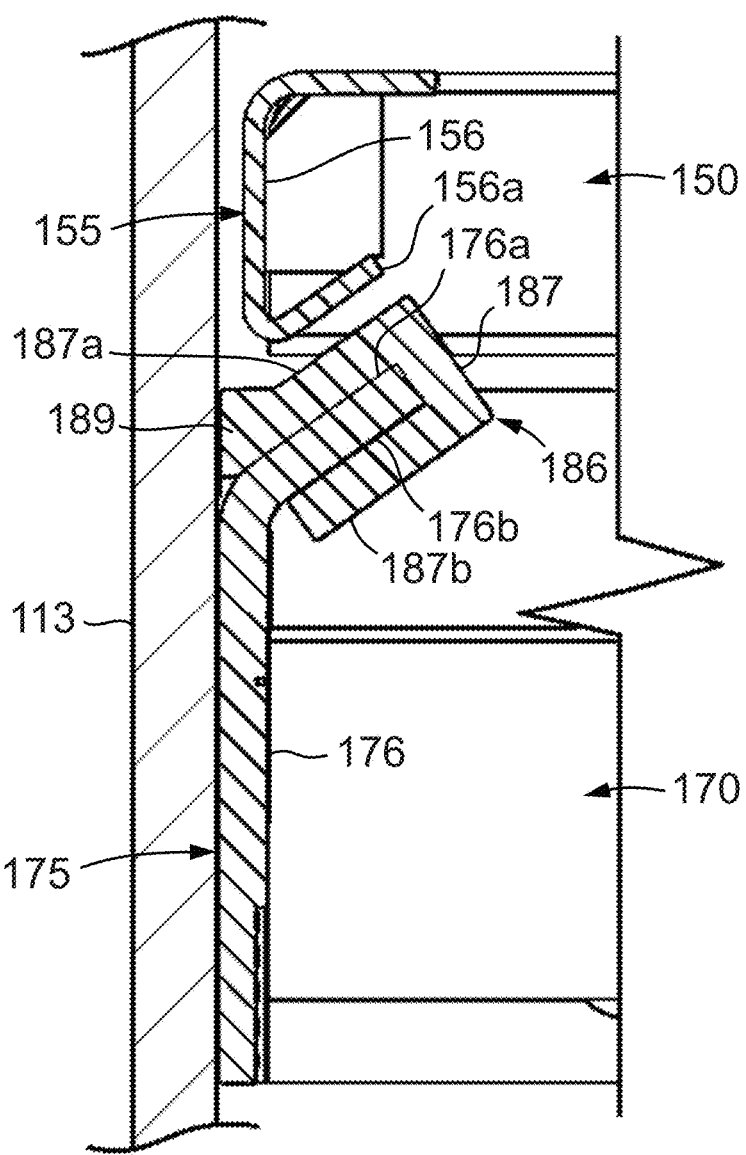
FIG. 8 is an enlarged cross-sectional view of the engaged screen and screen support of FIG. 4 engaged with a side wall of a basket of the shaker of FIG. 2 according to some embodiments.

Referring now to FIG. 8, as previously described the wear members 186 engaged with the angled ends 176*a* of the second members 176 of screen supports 170 may have a generally U-shaped cross section. In particular, each wear member 186 includes a cap 187 and a pair of parallel legs 187*a*, 187*b* extending away from cap 187. The legs 187*a*, 187*b* extend along the top and bottom sides, respectively, of the angled ends 176*a* of second members 176. Thus, the legs 187*a*, 187*b* may be referred to herein as the upper leg 187*a* and the lower leg 187*b*. The upper leg 187*a* may engage with the angled end 156*a* of second members 156 of screen 150. In addition, the upper leg 187*a* terminates in a seal member 189 that is to engage with the side wall 113 of the basket 112 (FIG. 2). The seal member 189 may be spaced from the cap 187 along the upper leg 187*a*.

Referring now to FIGS. 2 and 8, during operations, the seal member 189 may prevent cuttings or potentially drilling fluids from flowing or otherwise advancing between the screen supports 170 and side walls 113 of the basket 112. Thus, the seal members 189 on wear members 187 may prevent formation cuttings from circumventing the screens 150 and advancing into the base 110 of shaker 100 during operations.

Referring again to FIG. 4, the screen support 170 may include a latch assembly 200 that is configured to selectively secure the screen 150 to the screen support 170 during operations. The latch assembly 200 may include a plurality of hook assemblies 210 mounted to a shaft 202 that extends through screen support 170. In particular, as shown in FIG. 4, the shaft 202 may extend through support members 178 of the mounting assemblies 171 and the second members 176. Shaft 202 includes a central or longitudinal axis 205 that may be coaxially aligned with second axis 179. During operations, the hook assemblies 210 may be rotated on shaft 202 about axis 205 to selectively engage the hook assemblies 210 with the clamping bars 160 of mounting brackets 161 so as to pull the screen 150 downward onto the screen support 170. Further details of the latch assembly 200 are now provided below.

Figure 9:
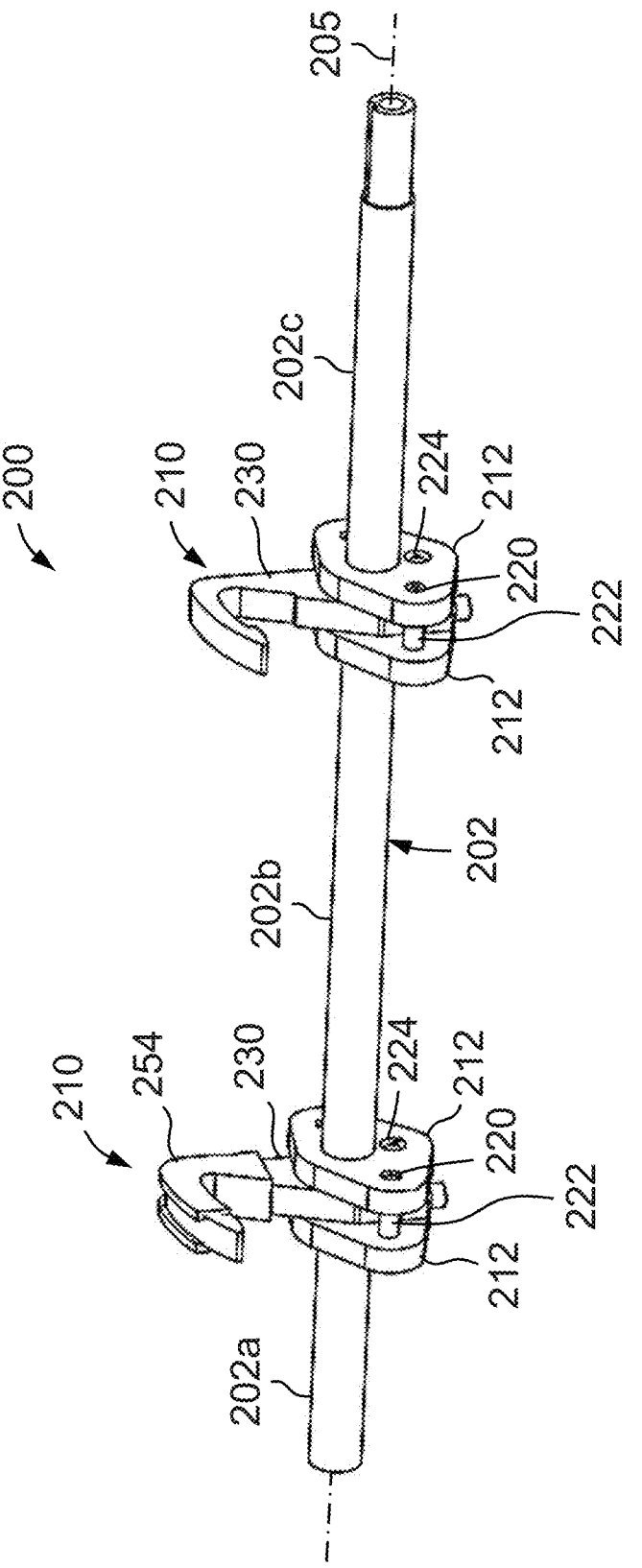
FIG. 9 is a perspective view of a latch assembly for securing the screen and screen support of FIG. 4 to one another according to some embodiments.

Referring now to FIGS. 4 and 9, in some embodiments latch assembly 200 includes a plurality of hook assemblies 210 axially spaced along shaft 202 with respect to axis 205. The number and arrangement of hook assemblies 210 along shaft 202 may match the number and arrangement of mounting brackets 151 (and particularly clamping bars 160) on screen 150. The shaft 202 may comprise a plurality of segments 202*a*, 202*b*, 202*c* that are coupled end-to-end to one another along axis 205 via a plurality of cams 212. In particular, the segments 202*a*, 202*b* are coupled to one another via a first pair of cams 212, and the segments 202*b*, 202*c* are coupled to one another via a second pair of cams 212. In addition, each pair of cams 212 along shaft 202 are secured to a hook assembly 210 so that each pair of cams 212 fixes the hook assemblies 210 along shaft 202 during operations.

Figure 10:
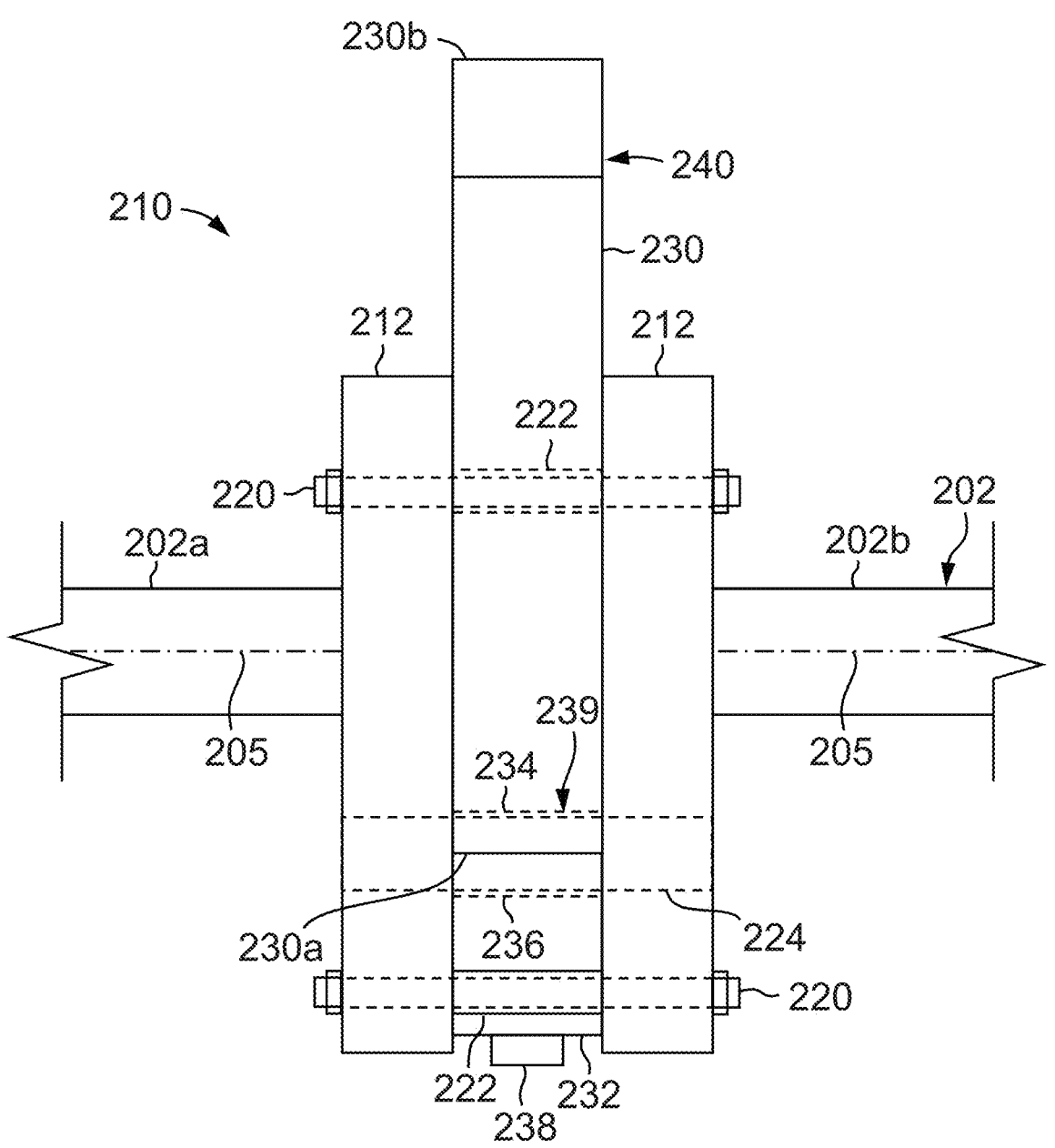
FIG. 10 is a front view of a hook assembly of the latch assembly of FIG. 9 according to some embodiments.

For instance, referring now to FIG. 10, the cams 212 coupling the segments 202*a*, 202*b* of shaft 202 are shown, it being understood that the coupling or connection between the segments 202*b*, 202*c* of shaft 202 is the same. The cams 212 are fixed to the axial ends of the segments 202a, 202b via any suitable method or mechanisms (e.g., cams 212 may be threaded, welded, etc. to the axial ends of segments 202a, 202b). A plurality of elongate coupling members 220 are engaged to the cams 212 to secure the cams 212 to one another. The coupling members 220 may comprise threaded bolts, screws, rivets, or any other suitable elongate coupling member. The coupling members 220 may extend through spacers 222 that are axially positioned between the cams 212 along axis 205 so as to maintained a suitable axial spacing between the cams 212 to accommodate hook assembly 210. The coupling members 220 may extend parallel to but are radially spaced from central axis 205.

A hook seat pin 224 is engaged to and axially positioned between the cams 212. The hook seat pin 224 may comprise a cylindrical member that is secured to one or both of the cams 212 (e.g., via threads, welding, etc.). The hook seat pin 224 may be parallel to and radially spaced or offset from the axis 205 and shaft segments 202a, 202b.

Figure 11:
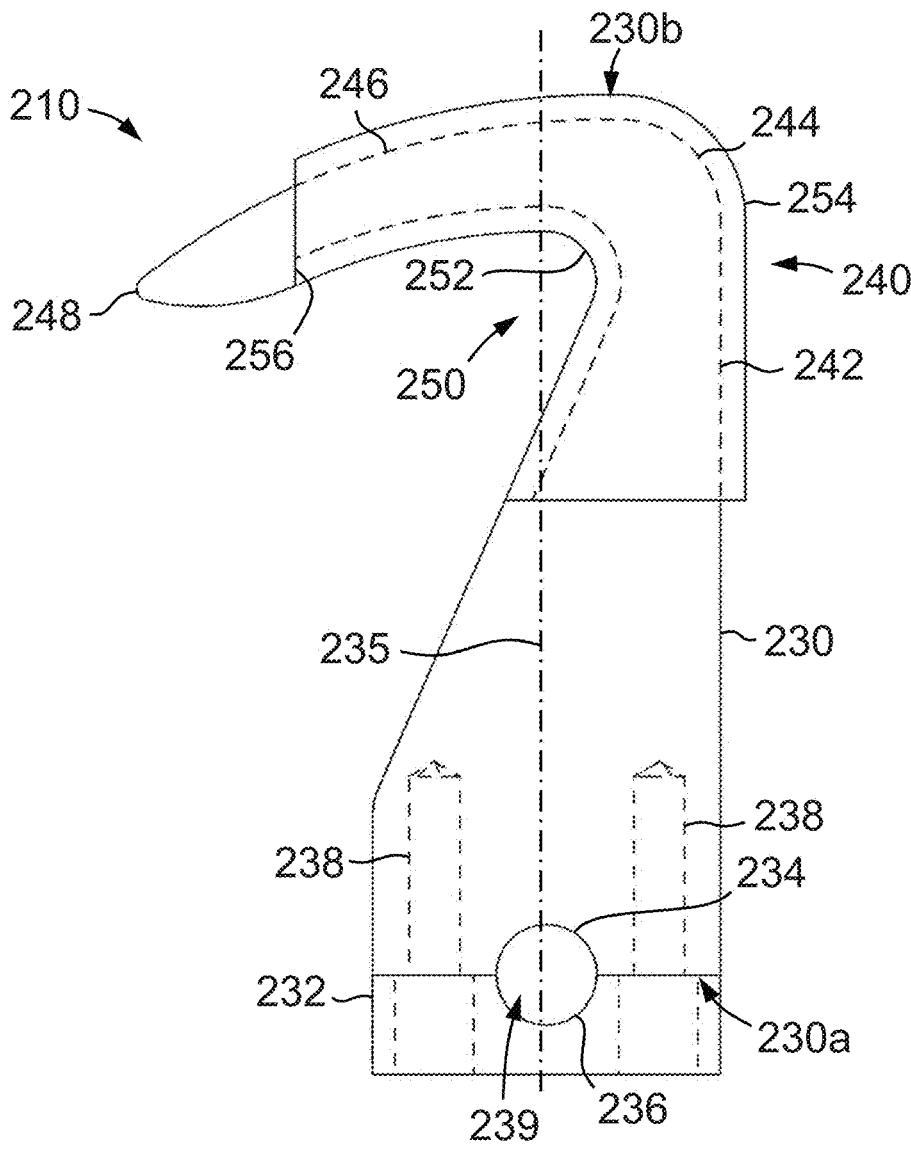
FIG. 11 is a side view of a hook of the hook assembly of FIG. 10 according to some embodiments.

Referring now to FIG. 11, each hook assembly 210 includes a body 230, and a saddle 232 coupled to body 230. Body 230 includes a longitudinal axis 235, a first or proximal end 230a, and a second or distal end 230b spaced from the proximal end 230a along axis 235. Proximal end 230a includes an arcuate recess 234 that may be cylindrical in shape. In some embodiments, the arcuate recess 234 comprises a half cylinder. Saddle 232 may comprise an arcuate recess 236 that is also cylindrical in shape (e.g., such as a half cylinder). The saddle 232 may be secured to second end 230a via a plurality of connection members 238. In some embodiments, the connection members 238 comprise screws, bolts, etc. When saddle 232 is secured to proximal end 230a of body 230, the arcuate recesses 234, 236 are aligned with one another to form a complete cylindrical bore 239. Referring again to FIG. 10, the cylindrical bore 239 may receive the hook seat pin 224 therein so as to secure the hook assembly 210 to the cams 212 joining shaft segments 202a, 202b (or the shaft segments 202b, 202c).

Referring again to FIG. 11, the distal end 230b of body 230 may comprise a hook 240. Hook 240 comprises a first segment 242 that extends generally axially along axis 235 to a bend 244, and a second segment 246 that extends outward and radially across and outward from axis 235 to a terminal end 248. The first segment 242 and the second segment 246 define a recess 250 that includes an arcuate seat 252 at or proximate to bend 244. The second segment 246 may comprise an arcuate member that curves axially away from distal end 230b and toward proximal end 230a when extending from bend 244 toward terminal end 248. Thus, the arcuate seat 252 may be axially closer to the distal end 230a than the other portions of recess 250.

A wear boot 254 is engaged over hook 240 so as to cover the recess 250. As will be described in more detail below, the wear boot 254 is configured to prevent direct contact between the hook 240 and clamping bar 160 (FIG. 4) on screen 150 to prevent premature wear of and reduce vibration transfer between hook assembly 210 and clamping bar 160 during operations. A shoulder 256 is formed on the hook 240, proximate terminal end 248. Wear boot 254 is engaged with shoulder 256 so as to prevent wear boot 254 from sliding along hook 240 toward terminal end 248 during operations.

Figure 12:
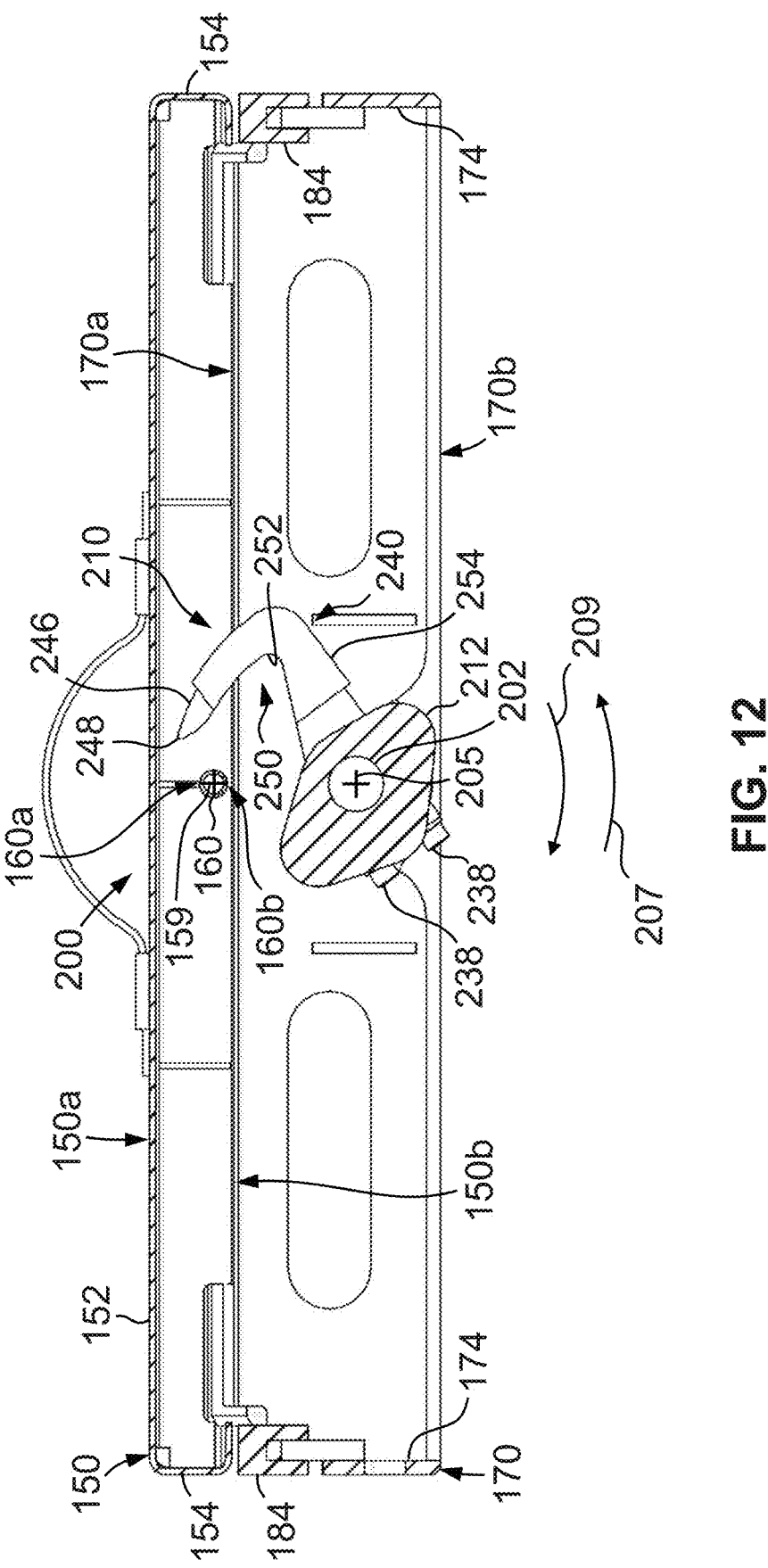
FIG. 12 is a cross-sectional view of the engaged screen and screen support of FIG. 4 with the latch assembly in an unlocked position according to some embodiments.
Figure 13:
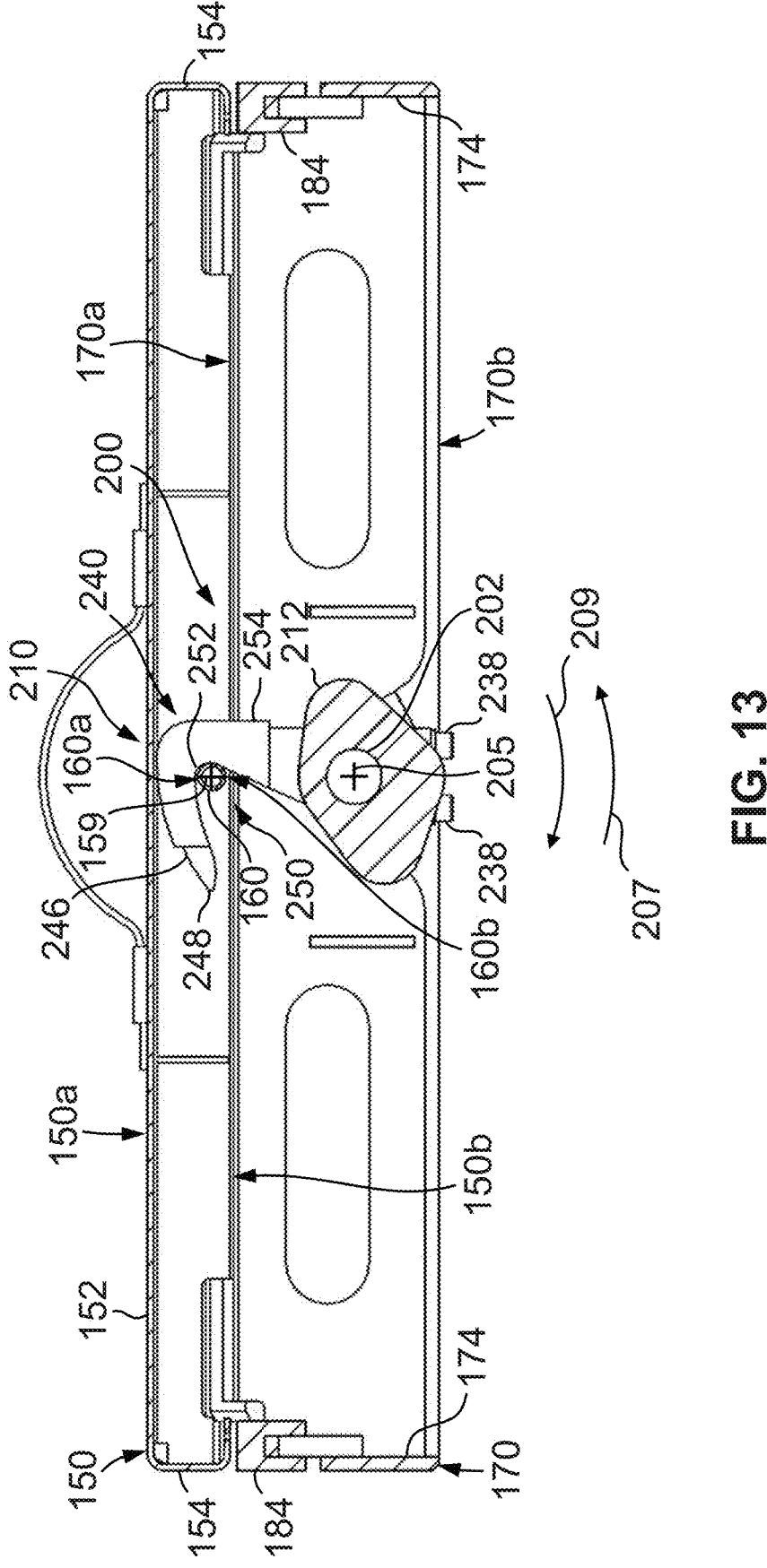
FIG. 13 is a cross-sectional view of the engaged screen and screen support of FIG. 4 with the latch assembly in a locked position according to some embodiments.

Referring now to FIGS. 12 and 13, after the screen 150 is placed on top of the screen support 170, the latch assembly 200 may be transitioned between a first or unlocked position as shown in FIG. 12 and a second or locked position as shown in FIG. 13. Specifically, in the unlocked position (FIG. 12), the shaft 202 is rotatably positioned about axis 205 so that the hook assemblies 210, and particularly hooks 240, are circumferentially spaced from clamping bar 160. The latch assembly 200 may be placed in the unlocked position (FIG. 12) during initial installation or withdrawal of the screen 150 from the screen support 170.

The latch assembly 200 may be transitioned to the locked position (FIG. 13) by rotating the shaft 202 about the axis 205 in a first direction 207 (which is a counter clockwise direction in the views of FIGS. 12 and 13) so that the hook assemblies 210 are also rotated about axis 205 in first direction 207 toward the clamping bar 160. Accordingly, the rotation of the shaft 202 and hook assemblies 210 may cause the clamping bar 160 to be received within the recess 250 of hook 240. Specifically, the clamping bar 160 may slide within the inner surface of recess 250 along the second segment 246 until the clamping bar 160 is seated in the arcuate seat 252.

The previously described curvature of the second segment 246 may facilitate sliding contact with a topmost point or portion of the clamping bar 160 and the recess 250 (specifically second segment 246 or the portion of wear boot 254 that overlays second segment 246) as the hook assembly 210 is transitioned from the unlocked position (FIG. 12) to the locked position (FIG. 13). In particular, as previously described, the clamping bars 160 may be coaxially aligned along the second axis 159 of screen 150. Thus, the clamping bars 160 may have a first or top side 160a that faces or opposes the top side 150a of screen 150 and that is radially opposite the bottom side 150b of screen 150 across second axis 159. In addition, the clamping bars 160 may also have a second or bottom side 160b that is radially opposite the top side 160a such that the bottom side 160b faces or opposes the bottom side 150b of screen 150 and is radially opposite the top side 150a of screen 150 across second axis 159.

As the latch assembly 200 transitions from the unlocked position (FIG. 12) to the locked position (FIG. 13), the second segments 246 (or the portion of wear boots 254 that overlay the second segments 246) may slide along the top side 160a of clamping bars 160, and may particularly engage with a top-most point or area along the top side 160a that is closest to the top side 150a of screen 150 (and thus closest to the screen member 152). Thus, the sliding contact between the hooks 240 and the top side 160a of clamping bars 160 may induce a generally downwardly directed force that pulls the clamping bars 160 (and the other portions of screen 150) downward toward screen support 170 (e.g., such as radially toward axis 205). Accordingly, without being limited to this or any other theory, the engagement of the hook 240 of each hook assembly 210 with the corresponding clamping bar 160 on screen 150 may encourage a downward compression of the screen 150 onto the screen support 170 and may prevent (or at least restrict) a lateral displacement of the screen 150 along the screen support 170 during operations and especially while transitioning the latch assembly from the unlocked position (FIG. 12) to the locked position (FIG. 13).

Referring again to FIG. 3, as previously described, the plurality of screens 150 and screen supports 170 may be arranged in columns 153 and rows 151 within trough 115 to form screen deck 104. Thus, the shafts 202 of the latch assemblies 200 (FIG. 4) of adjacent screen supports 170 (e.g., within the same column 153 as shown in FIG. 4) may be coupled to one another so that the coupled shafts 202 co-axially rotate with one another (about the aligned axes 205) during operations. The approximate location of a pair of coupled shafts 202 of adjacent hook latch assemblies 200 are shown schematically in FIG. 4 for the adjacent screens 150 and screen supports 170 of one column 153 in screen deck 104 so as to illustrate the placement of the shafts 202 of adjacent screens 150 and screen supports 170 along screen deck 104 according to some embodiments. In some embodiments, the shafts 202 of adjacent screen supports 170 (e.g., within a given column 153) may have suitable connectors (e.g., complimentary male and female connectors) that axially couple to one another and that transfer rotational torque between the coupled shafts 202.

Figure 14:
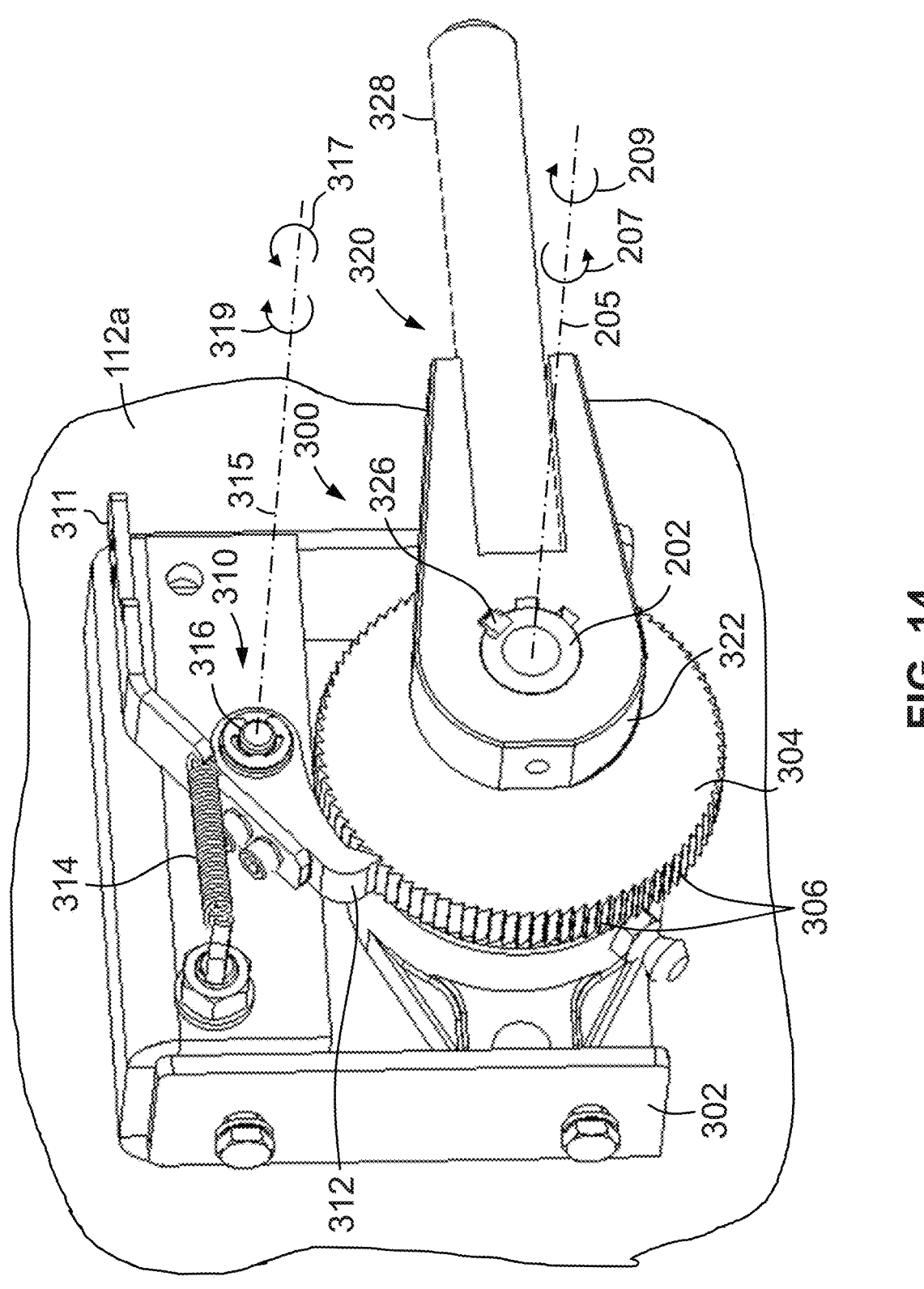
FIG. 14 is a perspective view of a ratchet assembly for use with the latch assembly of FIG. 9 according to some embodiments.

Referring briefly to FIGS. 2 and 3, the coupled shafts 202 (FIG. 3) of adjacent screens 150 and screen supports 170 (e.g., within a given row 153) may be coupled to a corresponding ratchet assembly 300 that is coupled to a side-wall 113 of basket 112. Referring now to FIG. 14, one of the ratchet assemblies 300 is shown according to some embodiments. In some embodiments, each of the ratchet assemblies 300 may be the same.

Ratchet assembly 300 includes a mounting bracket 302 that is secured (e.g., via welding, bolts, rivets, etc.) to the side-wall 113 of basket 112 (FIG. 2). Shaft 202 of one of the screen supports 170 (FIG. 3), or a segment thereof, extends out of side-wall 113 and through the mounting bracket 302 along axis 205. A ratcheting gear 304 (or more simply "gear 304") including a plurality of teeth 306 is engaged with shaft 202 such that shaft 202 extends through gear 304 along axis 205. The gear 304 may be engaged with shaft 202 such that gear 304 rotates about axis 205 along with shaft 202 during operations. For instance, gear 304 may be keyed to shaft 202, or gear 304 and shaft 202 may have complimentary torque transfer surfaces (e.g., facets) that engage with one another to force gear 304 and shaft 202 to rotate along with one another about axis 205.

Referring still to FIG. 14, a pawl assembly 310 is supported on bracket 302 that includes a pawl 312 that is rotatably mounted to a shaft or pin 316. The pin 316 includes a central or longitudinal axis 315 that is parallel and radially offset from axis 205 of shaft 202. A biasing member 314 (e.g., a coiled spring) is coupled to the pawl 312 so as to rotationally bias the pawl 312 about axis 315 in a first direction 317 to engage pawl 312 with teeth 306 of gear 304. The teeth 306 may be triangular or saw-tooth in shape and oriented such that rotation of gear 304 and shaft 202 in the first direction 207 deflects pawl 312 radially away from axis 205 such that pawl 312 rotates about axis 315 in a second direction 319 against the bias provided by biasing member 314. The second direction 319 is opposite the first direction 317. Conversely, rotation of gear 304 and shaft 202 in a second direction 209 that is opposite the first direction engages teeth 306 with pawl 312 thereby stopping further rotation of shaft 202 in second direction. Thus, pawl 312 may allow free rotation of gear 304 and shaft 202 in the first direction 207 during operations, but may prevent or restrict rotation of gear 304 and shaft 202 in the second direction 209.

Referring now to FIGS. 12-14, the rotation of the shaft 202 in the first direction 207 may transition the latch assemblies 200 coupled to the shaft 202 from the unlocked position (FIG. 12) to the locked position (FIG. 13). Conversely, rotation of the shaft 202 in the second direction 209 may transition the latch assemblies 200 coupled to the shaft 202 from the locked position (FIG. 13) to the unlocked position (FIG. 12).

A handle assembly 320 is mounted to the shaft 202. In particular, handle assembly 320 includes a connector 322 and a handle 328 extending outward from connector 322. The connector 322 engages with the shaft 202 such that handle assembly 320 may rotate along with shaft 202 and gear 304 about axis 205 during operations. For instance, a key member 326 may be engaged between the connector 322 and shaft 202 that is to prevent connector 322 from rotating relative to shaft 202 (or vice versa) during operations. When connector 322 is engaged with shaft 202 in the manner described above (and shown in FIG. 14), the handle 328 may extend radially outward from connector 322 with respect to axis 205.

During operations the shaft 202 and gear 304 (and thus also hook assemblies 210) may be rotated about axis 205 via the handle assembly 320 so as to transition the latch assemblies 200 between the unlocked position (FIG. 12) and locked position (FIG. 13) as previously described. In addition, the pawl assembly 310 may prevent or restrict rotation of the shaft 202 and gear 304 in the second direction 209 as previously described (e.g., to transition the hook latch assembly from the locked position to the unlocked position) to prevent undesired actuation of latch assembly 200 from the locked position (FIG. 13) to the unlocked position (FIG. 12). However, personnel may disengage the pawl 212 from gear 304 when desired via a lever 311 that is coupled to and extends outward from the pawl 312. Specifically, personnel may press downward on the handle 311 to rotate the pawl 312 in the second direction 319 about axis 315 and thereby disengage pawl 312 from teeth 306 or gear 304. Once pawl 312 is disengaged from teeth 306, the shaft 202 and gear 304 may be freely rotated in the second direction 209 to thereby transition the latch assembly 200 from the locked position (FIG. 13) to the unlocked position (FIG. 12) and allow for the removal of screens 150 from screen deck 104.

Figure 15:
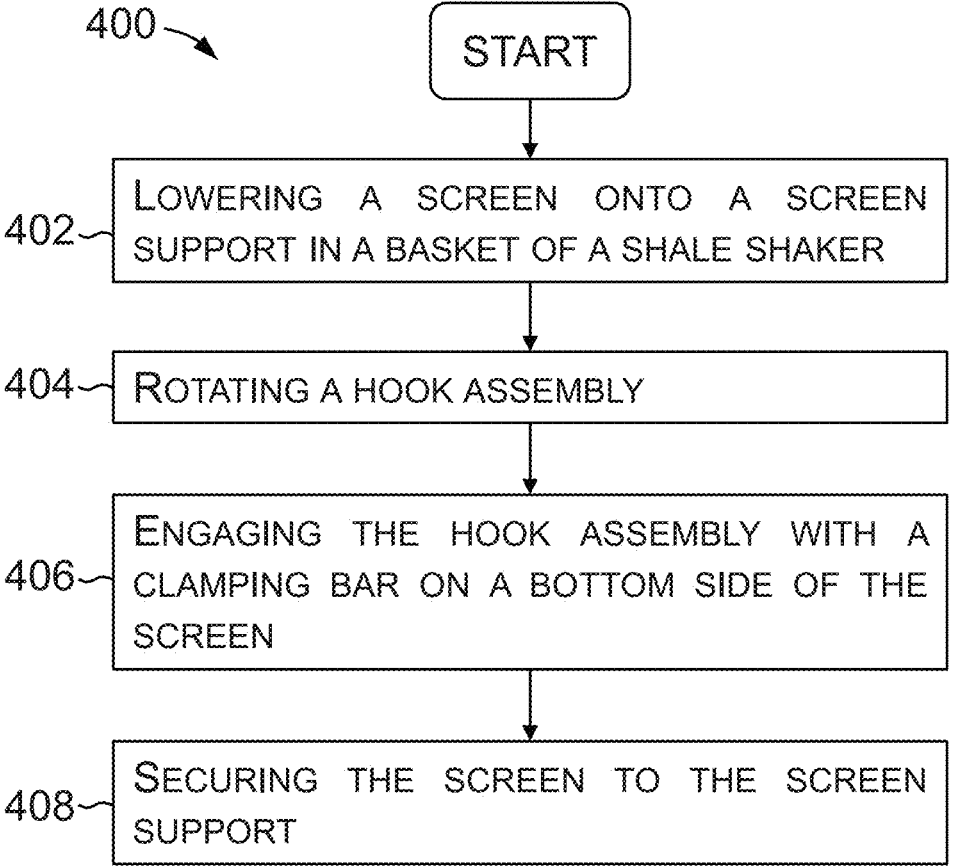
FIG. 15 is a flowchart of a method of securing a screen within a shale shaker according to some embodiments.

Referring now to FIG. 15, a method 400 of securing a screen within a shale shaker is shown according to some embodiments. In some embodiments, method 400 may be performed using the shaker 100 and screen deck 104 (including screens 150 and screen supports 170) as described herein. Thus, in describing method 400, reference is made to these previously described components and embodiments. However, it should be appreciated that in some embodiments, method 400 may be performed using different components and systems.

Initially, method 400 includes lowering a screen onto a screen support in a basket of a shale shaker at block 402. For instance, as shown in FIGS. 4, 6, and 7, the screen 150 may be lowered in a vertical direction onto a corresponding screen support member 170. During this process, the angled ends 156a, 158a on the screen 150 may engage with the angled ends 176a, 178a of members 176, 178, respectively, via the wear members 186, 188, respectively. The angles (e.g., angles θ, β, α, φ, as previously described) of the angled ends 156a, 158a, 176a, 178a may cause the screen 150 to center itself on the screen support 170 when the screen 150 is lowered onto the screen support 170.

Referring still to again to FIG. 15, method 400 also includes rotating a hook assembly at block 404. For instance, as shown in FIGS. 12 and 13, the hook assemblies 210 of the latch assembly 200 may be rotated about the axes 205 of the corresponding shaft 202. The hook assemblies 210 and shafts 202 may be rotated via a ratcheting assembly such as the ratcheting assembly 300 shown in FIG. 14 and described herein.

Referring again to FIG. 15, method 400 includes engaging the hook assembly with a clamping bar on a bottom side of the screen at block 406 and securing the screen to the screen support at block 408. For instance, as shown in FIGS. 12 and 13, rotation of the hook assemblies 210 about the axes 205 of the corresponding shafts 202 (e.g., in the first direction 207) engages the hook 240 of each hook assembly 210 with a corresponding one of the clamping bars 160 on the bottom sides 150b of the screens 150. As previously described, the engagement of the hooks 240 with the clamping bars 160 may result in a downward pull of the screens 150 onto the screen supports 170.

Referring again to FIGS. 2 and 4, the mounting brackets 161 (including clamping bars 160) and latch assemblies 200 may be collectively referred to as a "connection assembly" for securing each of the screens 150 on the corresponding screen supports 170 within the screen deck 104 (FIG. 3). The connection assemblies may be positioned along a bottom sides 150b of the screens 150 so that the connection assemblies may not become an obstruction that may impede vertical insertion and withdrawal of the screens 150 from basket 12 during operations. In other embodiments, the connection assemblies may utilize alternative designs other than clamping bars 160 and latch assemblies 200 (e.g., bolts, pins, latches, etc.). But, even in these embodiments, the connection assemblies may be positioned along the bottom sides 150b of the screens 150 so as to prevent the formation of an obstruction along the top sides 150a of the screens 150 as previously described above.

In some particular embodiments, a screen for a shale shaker includes a top side and a bottom side opposite the top side; a screen member including a plurality of openings on the top side; and a mounting bracket positioned along the bottom side. The mounting bracket includes a pair of parallel first support members and a clamping bar coupled to and extending between the pair of first support members.

The pair of parallel first support members may include angled ends that project toward one another, and that are angled away from the top side.

The screen may also include an outer perimeter having a pair of first members, and a pair of second members that extend perpendicularly to the pair of first members. The pair of second members extend parallel to the pair of parallel first support members and the pair of first members extend parallel to the clamping bar. The pair of second members may include angled ends that angle toward the top side. Also, the angled ends of the pair of second members may project inward from the outer perimeter.

The embodiments disclosed herein include shakers having screens that may be secured via latch assemblies that are positioned below the screen such that they do not create an obstruction for vertical insertion or withdrawal of the screens during the operations. Accordingly, through use of the embodiments disclosed herein, construction, deconstruction, and maintenance of the screens of a shaker may be simplified and enhanced.

The discussion above is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection.

Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A shale shaker for separating formation cuttings from a drilling fluid, the shale shaker comprising:
 a basket; and
 a screen deck positioned within the basket, wherein the screen deck comprises a plurality of screens positioned on a plurality of screen supports, such that each screen is positioned on a corresponding one of the plurality of screen supports,
 wherein each screen includes a top side, a bottom side opposite the top side, and a mounting bracket positioned along the bottom side,
 wherein the mounting bracket comprises a pair of parallel first support members and a clamping bar coupled to and extending between the pair of first support members, and
 wherein each screen support comprises:
  a pair of parallel second support members; and
  a latch assembly including a hook assembly positioned between the pair of second support members, wherein the hook assembly is configured to rotate to engage with the clamping bar to secure the screen to the screen support.

2. The shale shaker of claim 1, wherein the pair of first support members each have angled ends that project away from one another,
 wherein the pair of second support members have angled ends that project toward one another, and
 wherein the angled ends of the pair of first support members are coupled to the angled ends of the pair of second support members.

3. The shale shaker of claim 2, wherein the angled ends of the pair of first support members are angled downward and the angled ends of the pair of second support members are angled upward.

4. The shale shaker of claim 3, wherein the hook assembly comprises:

a body including a first end and a second end; and a hook positioned at the first end, wherein the hook comprises:

a bend;

a first segment extending to the bend; and a second segment extending from the bend to a terminal end, wherein the second segment curves away from the first end toward the second end.

5. The shale shaker of claim 4, wherein the latch assembly comprises:

a shaft comprising a pair of segments coaxially aligned along a central axis;

a pair of cams, wherein each of the pair of cams is coupled to an end of one of the pair of segments; and a hook seat pin extending between the pair of cams, wherein the hook seat pin extends parallel to the central axis, and wherein the hook is engaged to the hook seat pin.

6. The shale shaker of claim 5, comprising a ratchet assembly coupled to the shaft, wherein the ratchet assembly comprises:

a gear that is configured to rotate with the shaft; and a pawl that is engaged with the gear, wherein the pawl is configured to allow rotation of the gear and the shaft in a first direction and is to prevent rotation of the gear and the shaft in a second direction that is opposite the first direction.

7. A screen deck for a shale shaker, the screen deck comprising:

a screen comprising:

a top side and a bottom side opposite the top side;

a screen member including a plurality of openings on the top side; and a clamping bar coupled to the bottom side; and a screen support comprising:

a plurality of first support members; and a latch assembly including a hook assembly, wherein the bottom side of the screen is configured to engage with the plurality of first support members of the screen support, and wherein the hook assembly is configured to rotate to engage with the clamping bar to pull the screen onto the screen support.

8. The screen deck of claim 7, wherein the hook assembly comprises:

a body including a first end and a second end;

a hook positioned at the first end, wherein the hook comprises:

a bend; and a first segment extending to the bend; and a second segment extending from the bend to a terminal end, wherein the second segment curves away from the first end toward the second end.

9. The screen deck of claim 8, wherein the first segment, the bend, and the second segment define a recess that is configured to receive the clamping bar, wherein the recess includes an arcuate seat.

10. The screen deck of claim 9, wherein the hook assembly comprises a wear boot that covers the recess.

11. The screen deck of claim 7, wherein the latch assembly comprises:

a shaft comprising a pair of segments coaxially aligned along a central axis;

a pair of cams, wherein each of the pair of cams is coupled to an end of one of the pair of segments; and a hook seat pin extending between the pair of cams, wherein the hook seat pin extends parallel to the central axis, and wherein the hook assembly is engaged with the hook seat pin.

12. The screen deck of claim 11, comprising a ratchet assembly coupled to the shaft, wherein the ratchet assembly comprises:

a gear that is configured to rotate with the shaft; and a pawl that is engaged with the gear, wherein the pawl is configured to allow rotation of the gear and the shaft in a first direction and is to prevent rotation of the gear and the shaft in a second direction that is opposite the first direction.

13. The screen deck of claim 7, wherein the plurality of first support members comprises a pair of parallel first support members, wherein the screen comprises a pair of parallel second support members on the bottom side, wherein the clamping bar extends between the pair of second support members, wherein the pair of first support members each have angled ends that project away from one another, wherein the pair of second support members have angled ends that project toward one another, and wherein the angled ends of the pair of first support members are coupled to the angled ends of the pair of second support members.

14. The screen deck of claim 13, wherein the angled ends of the pair of first support members are angled downward and the angled ends of the pair of second support members are angled upward.

15. A shale shaker for separating formation cuttings from a drilling fluid, the shale shaker comprising:

a basket including a trough;

a screen positioned within the trough, the screen including a top side and a bottom side opposite the top side;

a clamping bar coupled to the bottom side of the screen; and a latch assembly including a hook assembly that is configured to rotate to engage the clamping bar to secure the screen with in the trough of the basket.

16. The shale shaker of claim 15, wherein the hook assembly comprises:

a body including a first end and a second end; and a hook positioned at the first end, wherein the hook comprises:

a bend;

a first segment extending to the bend; and a second segment extending from the bend to a terminal end, wherein the second segment curves away from the first end toward the second end.

17. The shale shaker of claim 16, wherein the first segment, the bend, and the second segment define a recess that is configured to receive the clamping bar, wherein the recess includes an arcuate seat.

18. The shale shaker of claim 17, comprising a screen support positioned under the screen, wherein the screen support comprises a pair of parallel first support members, wherein the screen comprises a pair of parallel second support members on the bottom side, wherein the clamping bar extends between the pair of second support members, wherein the pair of first support members each have angled ends that project away from one another, wherein the pair of second support members have angled ends that project toward one another, and wherein the angled ends of the pair of first support members are coupled to the angled ends of the pair of second support members.

19. The shale shaker of claim 18, wherein the angled ends of the pair of first support members are angled downward and the angled ends of the pair of second support members are angled upward.

20. The shale shaker of claim 19, wherein the latch assembly comprises:

a shaft comprising a pair of segments coaxially aligned along a central axis;

a pair of cams, wherein each of the pair of cams is coupled to an end of one of the pair of segments; and a hook seat pin extending between the pair of cams, wherein the hook seat pin extends parallel to the central axis, and wherein the hook is engaged with the hook seat pin.

\* \* \* \* \*